Patented Sept. 12, 1933

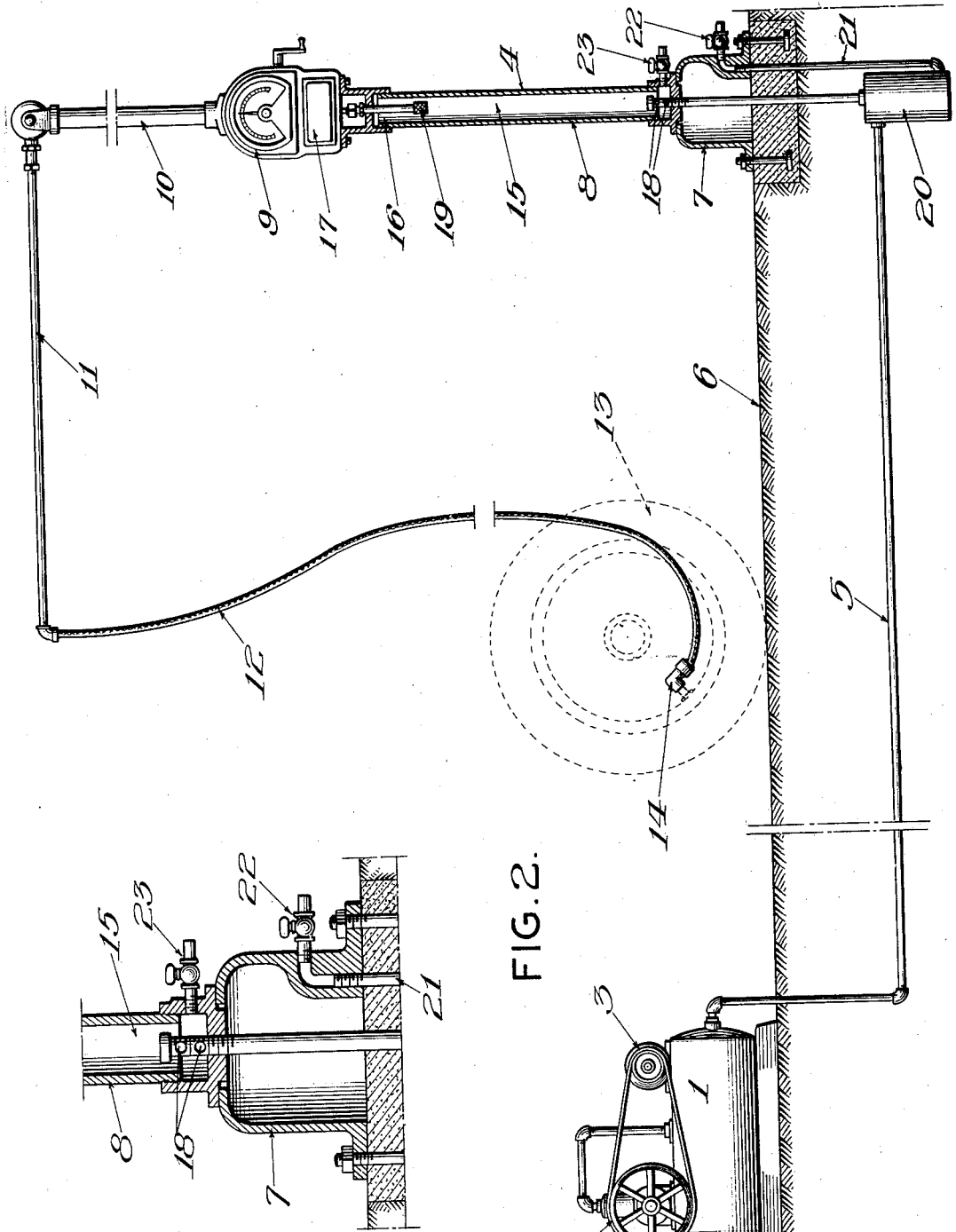

1,926,726

UNITED STATES PATENT OFFICE 1,926,726

FLUID DELIVERY APPARATUS

George A. Knaak, Milwaukee, Wis.

Application August 9, 1930. Serial No. 474,193

6 Claims. (Cl. 221—73.5)

The invention relates to fluid delivery apparatus and a method of delivering compressible fluids.

The apparatus to which the invention applies in particular has a power plant for compressing the fluid, a mechanism for delivering the fluid, and a pipe for transporting the compressed fluid from the power plant to the delivery mechanism.

The invention may be employed to deliver any compressible fluid and to remove foreign matter therefrom before the same enters the delivery mechanism, such as natural or artificial gas, which is transported at high pressures through pipes and then delivered at lower pressures for distribution or consumption.

The invention is ordinarily applied to a tire inflating apparatus which has a delivery mechanism to control the flow of compressed air into the tire and to limit the ultimate pressure therein.

Such an apparatus has a power driven compressor and a storage or equalizing tank which are usually arranged within a protecting structure, a delivery mechanism which is usually arranged out of doors, a pipe which connects the delivery mechanism to the tank and is usually buried under ground, and a service hose for connecting the delivery mechanism to the tire.

When air is compressed, its moisture carrying capacity is reduced and a part of the moisture carried thereby condenses upon the walls of the tank and the connecting pipe and collects in the lower parts thereof, and this condensate causes oxidation of the interior of the tank and pipe which eventually contain a large quantity of iron oxide.

If the connecting pipe is provided with a trap for removing the condensate therefrom, the stream of compressed air flowing therethrough reduces the iron oxide to a powder and carries a part of it into the delivery mechanism.

If the connecting pipe has no trap, the condensate therein is agitated by the air stream, the iron oxide is mixed with the condensate, and a spray containing particles of iron oxide is carried by the air stream into the delivery mechanism.

In either case, the particles of iron oxide eventually clog the delivery mechanism and prevent it from functioning.

Also, the iron oxide and condensate sometimes forms a layer of thin paste upon the walls of the vertical pipe which leads into the delivery mechanism, and this paste is carried upwardly by the pulsations of the air stream and eventually enters the delivery mechanism and clogs the same.

Due to the connecting pipe being buried underground, the compressed air flowing therethrough is warmer in cold weather than the delivery mechanism, and a part of the moisture carried by the compressed air is condensed after it enters the delivery mechanism, and the condensate thus produced freezes and seriously impedes the operation of the delivery mechanism or renders it totally inoperative.

An object of the invention is to prevent solids carried by the air stream from being deposited within the delivery mechanism.

Another object is to prevent condensation within the delivery mechanism of moisture carried by the fluid stream.

Another object is to provide a chamber in which condensible and precipitable matter may be trapped.

Another object is to interrupt the velocity of the fluid stream to cause precipitation of foreign matter carried thereby.

Another object is to change the temperature of the compressed air to substantially that of the delivery mechanism before the air enters the same.

Another object is to provide apparatus of this character which may be readily incorporated in existing air delivery apparatus.

According to the invention, a precipitation chamber is arranged between the source of fluid under pressure and the delivery mechanism to interrupt the velocity of the fluid stream and cause foreign matter carried thereby to be precipitated within the chamber.

It further contemplates subjecting the precipitating chamber to the same temperature and atmospheric conditions as the delivery mechanism.

After the air enters the precipitation chamber, its velocity is reduced and particles of solid matter carried therein by entrainment are enabled to precipitate.

During cold weather, the air has its temperature reduced by being exposed to the atmospheric temperature and its moisture content will be reduced by condensation.

The moisture precipitated by condensation will precipitate by entrainment, particles of foreign matter which do not have sufficient weight to be precipitated by gravity.

The result obtained by this invention is that the delivery mechanism is kept free from foreign matter which has heretofore interfered with the operation thereof.

The accompanying drawing illustrates the invention and the views therein are as follows:

Fig. 1 is a schematic drawing of a tire inflating apparatus embodying the invention, the air tower being shown partly in vertical section.

Fig. 2 is a vertical section through the base of the tower.

The apparatus has a primary air supply or power unit which comprises a storage or equalizing tank 1, an air compressor 2 to supply compressed air to the tank 1, and an electric motor 3 to drive the compressor.

The power unit is ordinarily arranged within a building to protect it from low temperatures, and the tank 1 is connected to a tire inflator 4 by an air supply pipe 5 which is buried in the ground beneath a pavement 6.

The tire inflator 4 is supported upon the pavement 6 and has a hollow base 7, a tubular standard 8 arranged upon the base 7, a delivery mechanism or fluid meter 9 carried by the standard 8, a column 10 carried by the casing of the delivery mechanism 9, an arm 11 pivoted upon the upper end of the column 10, and a service hose 12 carried by the arm 11.

Compressed air is delivered to a tire 13 through the service hose 12 which has one of its ends connected to the outlet of the delivery mechanism 9 and its other end provided with a valve chuck 14 for connection with the valve stem of the tire 13.

The standard 8 is closed at both ends and forms a secondary air supply or precipitation chamber 15, which is connected at its lower end to the supply pipe 5 and connected at its upper end to the delivery mechanism 9 by pipe 16.

The delivery mechanism 9 is similar to the fluid meter disclosed in my copending application, Serial No. 446,897, filed April 24, 1930, and provides an intermediate or measuring chamber 17 which is charged with compressed air until the pressure therein reaches a predetermined maximum, then communication between it and the precipitation chamber 15 is cut off and its fluid contents is discharged into the tire 13 until the fluid pressure in the delivery mechanism 9 reaches a predetermined minimum, and then the delivery of air to the tire 13 is discontinued and communication with the chamber 15 is reestablished to recharge the delivery mechanism 9 to the predetermined maximum pressure.

Successive measured charges of compressed air are thus delivered to the tire 13 until the pressure therein has reached a predetermined maximum, which is determined by the adjustment of the delivery mechanism 9, and then the delivery mechanism 9 ceases to function, as fully set forth in my application referred to above.

When the valve chuck 14 is applied to the valve stem of the tire 13, a portion of the secondary supply of compressed air in the chamber 15 is discharged at a high velocity through the pipe 16 into the delivery mechanism 9, and this air is instantly replaced by air from the primary supply which flows through the supply line 5 at a high velocity.

The chamber 15 has a considerably greater cross-sectional area than the supply line 5 and contains a relatively large volume of air, consequently, the velocity of the air stream is materially reduced between the tank 1 and the delivery mechanism 9.

Particles of water, iron oxide, and other foreign matter, which are carried upwardly by the velocity of the air stream and which would ordinarily enter the delivery mechanism, are precipitated in the chamber 15 due to the low velocity of the air stream at this point.

The height of the chamber 15 ordinarily precludes the possibility of particles of foreign matter being carried into the delivery mechanism 9 by the air stream but, in some instances however, the iron oxide in the air supply line 5 is so finely comminuted that a part of it may be substantially held in suspension in moisture laden air.

By directing the incoming air against the side walls of the chamber 15, as much as possible of the moisture carried by the air is condensed, and the particles of foreign matter adhere to the side walls or are precipitated.

Further, if the air in the chamber 15 is caused to swirl, the possibility of a high velocity area at the center of the air stream is avoided, and, if the incoming air is warmer than the delivery mechanism 9, the temperature thereof is reduced to substantially that of the delivery mechanism by coming in contact with the cold side walls of the chamber 15.

The air may be directed against the side walls of the chamber 15 by extending the supply line 5 upwardly into the chamber 15, closing its upper end, and providing outlets 18 in its side walls.

As a further safeguard against particles of foreign matter entering the delivery mechanism 9, a fine mesh screen may be interposed between the inlet and the outlet of the chamber 15, such as a strainer 19 attached to the lower end of the pipe 16.

The chamber 15 may be provided with a drain at its bottom for the removal of water and sediment, and this drain may include a trap 20 arranged beneath the tire inflator 4 and connected in the supply line 5.

Moisture condensed in the chamber 15 will drain into the trap 20 through the lower outlets 18 and carry with it a large part of the foreign matter which has been precipitated in the chamber 15.

The contents of the trap 20 may be discharged through a pipe 21 which has its lower end connected to the trap 20 and its upper end closed by a blow-off valve 22 and supported by the base 7 of the tire inflator 4.

By opening the valve 22, the air pressure in the supply line 5 will force the liquid contents of the trap 20 out through the pipe 21 and through the valve 22 and carry with it a large part of the precipitated solid matter.

Instead of draining the condensate and precipitate into a trap and then discharging it by air pressure, a drain cock 23 may be connected to the chamber 15 at the bottom thereof and the collected matter drained off by simply opening the cock 23.

The danger of condensate forming in the delivery mechanism 9 is further precluded by the fact that the moisture carrying capacity of compressed air increases as the pressure thereof decreases.

The motor 3 is automatically controlled to operate the compressor and maintain the pressure in the tank 1 above a predetermined minimum, the delivery mechanism 9 is adjusted to operate at a maximum pressure which is lower than the minimum tank pressure, and the maximum pressure in the tire is always lower than the maximum pressure in the delivery mechanism.

Consequently, the moisture carrying capacity of the air increases as it passes into and through the delivery mechanism.

The invention herein set forth is susceptible of various modifications and adaptations without departing from the scope thereof as hereafter claimed.

The invention is hereby claimed as follows:

1. In combination, a compressed fluid supply source, a conduit of restricted cross-sectional area communicating with said source, a device for dispensing fluid from said source at regulated pressure, a receiver forming a velocity reducing passage of considerably greater cross-section than that of said conduit interposed between said conduit and said device, the confining wall of said passage being exposed directly to the surrounding atmosphere and being of sufficient extent and conductivity to cause substantial modification of the temperature of fluid flow through said passage to conform with that of said atmosphere, and means for delivering fluid into the lower central portion of said receiver.

2. In combination, a compressed fluid supply source, a conduit of restricted cross-sectional area communicating with said source, a device for dispensing fluid from said source at regulated pressure, a receiver forming an upwardly extending velocity reducing passage of considerably greater cross-section than that of said conduit communicating at its lower end with said conduit and at its upper end with said device, the confining wall of said passage being exposed directly to the surrounding atmosphere and being of sufficient extent and conductivity to cause substantial modification of the temperature of fluid flowing through said passage to conform with that of said atmosphere and means for delivering the fluid admitted to said receiver against the wall thereof.

3. In combination, a compressed fluid supply source, a conduit of restricted cross-sectional area communicating with said source, a device for dispensing fluid from said source at regulated pressure, a receiver forming an upwardly extending velocity reducing passage of considerably greater cross-section than that of said conduit communicating with said device, the confining wall of said passage being exposed directly to the surrounding atmosphere and being of sufficient extent and conductivity to cause substantial modification of the temperature of fluid flowing through said passage to conform with that of said atmosphere, and means for delivering fluid from said conduit outwardly against the lower portion of said confining wall.

4. In combination, a compressed fluid supply source, a conduit of restricted cross-sectional area communicating with said source, a receiver forming an upwardly extending velocity reducing passage of considerably greater cross-section than that of said conduit communicating at its lower end with said conduit, a device for dispensing fluid from said source at regulated pressure, means for admitting fluid into the lower central portion of said passage, and means for delivering fluid from the upper central portion of said passage to said device.

5. In combination, a compressed fluid supply source, a conduit of restricted cross-sectional area communicating with said source, a device for dispensing fluid from said source at regulated pressure, a receiver forming an upwardly extending velocity reducing passage of considerably greater cross-section than that of said conduit interposed between said conduit and said device, means for delivering fluid from said conduit outwardly against the lower confining wall of said passage, and means for delivering fluid from the upper central portion of said passage to said device.

6. In combination, a compressed fluid supply source, a conduit of restricted cross-sectional area for conducting fluid from said source, a device for dispensing fluid from said source at regulated pressure, a receiver forming an unobstructed upwardly extending velocity reducing passage of circular cross-section greater than that of said conduit interposed between said conduit and said device, the confining wall of said passage being of considerable length to form a substantially cylindrical chamber of extended vertical height, means for delivering fluid from said conduit outwardly against the lower portion of said passage confining wall, and means for delivering fluid from the upper central portion of said passage to said device.

GEORGE A. KNAAK.